United States Patent [19]
Yoshiaki

[11] Patent Number: 5,574,833
[45] Date of Patent: Nov. 12, 1996

[54] IMAGE PROCESSING APPARATUS FOR THE SMOOTH ENLARGEMENT AND MULTILEVELING OUTPUT OF AN IMAGE

[75] Inventor: Hanyuh Yoshiaki, Matsubara Soka, Japan

[73] Assignee: Ricoh Company, Ltd., Tokyo, Japan

[21] Appl. No.: 115,148

[22] Filed: Sep. 2, 1993

[30] Foreign Application Priority Data

Sep. 2, 1992 [JP] Japan ................................... 4-234593

[51] Int. Cl.$^6$ ................................................. H04N 1/40
[52] U.S. Cl. ................................................. 395/109; 358/456
[58] Field of Search ................................ 395/106, 109, 395/114, 126, 132; 358/282, 283, 284, 456, 447, 296, 455, 298, 465, 429

[56] References Cited

U.S. PATENT DOCUMENTS

| | | | |
|---|---|---|---|
| 4,434,431 | 2/1984 | Ohkubo et al. | 346/154 |
| 4,437,122 | 3/1984 | Walsh et al. | 358/166 |
| 4,578,713 | 3/1986 | Tsao et al. | 358/283 |
| 4,668,995 | 5/1987 | Chen et al. | 358/282 |
| 4,894,727 | 1/1990 | Sasaki | 358/429 |
| 5,016,118 | 5/1991 | Mannichi | 358/462 |
| 5,025,325 | 6/1991 | Hudson | 358/447 |
| 5,055,944 | 10/1991 | Shibahara | 358/465 |
| 5,140,441 | 8/1992 | Sugiura et al. | 358/456 |
| 5,148,287 | 9/1992 | Kemmochi et al. | 358/298 |
| 5,291,309 | 3/1994 | Semasa | 358/455 |
| 5,309,245 | 5/1994 | Hayashi et al. | 358/296 |

FOREIGN PATENT DOCUMENTS 0262801  4/1988  European Pat. Off. ..

*Primary Examiner*—Raymond J. Bayerl
*Assistant Examiner*—Gabriel I. Garcia
*Attorney, Agent, or Firm*—Woodcock Washburn Kurtz Mackiewicz & Norris

[57] ABSTRACT

An image processing apparatus which comprises a smoothing enlarger for enlarging some binary image data into more binary image data of black and white pattern for reducing a jaggy image, a divider for dividing the binary image data into some blocks of binary image data, and a multileveler for multileveling each block and making multilevel image data. In accordance of the invention, smoothing enlargement, dividing, and multileveling is achieved by a novel method.

12 Claims, 4 Drawing Sheets

$n_1 = n_2 = 12$ $q_1 = q_2 = 1$ $q_1 = q_2 = 2$ $n_1 = n_2 = 6$

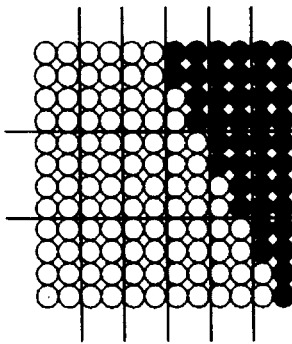
FIG. 4A
1 × 1 times
$m_1 = m_2 = 12$
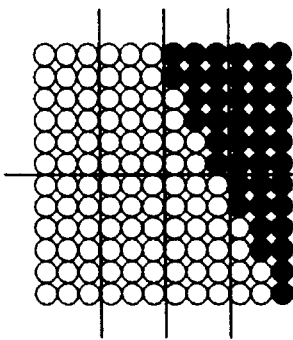
FIG. 4C
2 × 4 times
$m_1 = 6$
$m_2 = 3$
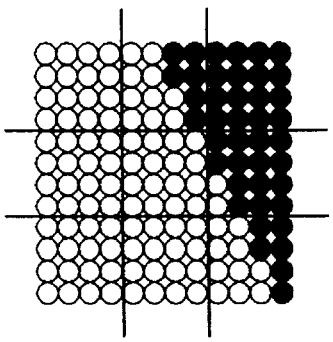
FIG. 4E
3 × 6 times
$m_1 = 4$
$m_2 = 2$
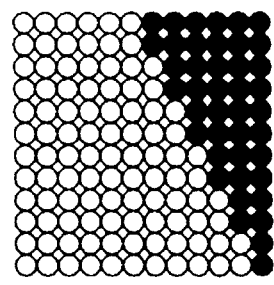
FIG. 4B
2 × 2 times
$m_1 = m_2 = 6$
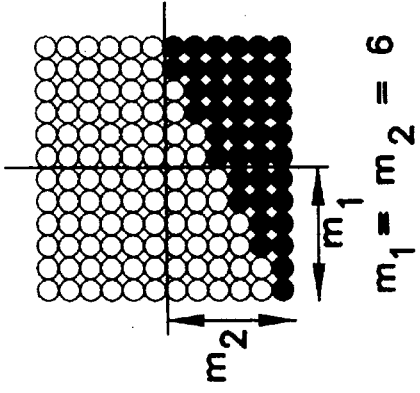
FIG. 4D
3 × 3 times
$m_1 = m_2 = 4$
FIG. 4F
$$= \frac{K_1}{q_1} \times \frac{K_2}{q_2} \text{ times} \cdots (a)$$
$$= \underbrace{\left(\frac{n_1/m_1}{q_1}\right)}_{} \times \underbrace{\left(\frac{n_2/m_2}{q_2}\right)}_{} \text{ times} \cdots (b)$$

1.5 × 1.5 times $m_1 = m_2 = 2$ 1.5 × 3 times $m_1 = 2$
$m_2 = 1$

IMAGE PROCESSING APPARATUS FOR THE SMOOTH ENLARGEMENT AND MULTILEVELING OUTPUT OF AN IMAGE

BACKGROUND OF THE INVENTION

1. Field of the Invention

This invention relates to an image processing apparatus, for use in a laser printer, a digital copying machine, or a digital facsimile. The invention particularly relates to an image processing apparatus, which achieves smooth enlargement and multilevel output of an image.

2. Related Art

There is a smoothing technique which is done by enlarging binary image data an integral number of times. The binary image data are enlarged and supplemented to smooth a jaggy image, for example a slant line, referring to image data adjacent to aimed data or datum. Therein the output is binary data. This technique is currently used in facsimile machines and the like.

Moreover, there is a high quality image technique which is done by multileveling the jaggy image of the binary image data in a printer which can output a multilevel image. An example of such a printer is an RET (Resolution Enhanced Technology) by Hewlett Packard company. Printer manufacturing companies use that printer or similar ones.

On the other hand, a digital copying machine has recently been introduced that is multifunctional. The product is schematically shown in FIG. 7. The system comprises a digital copying function as a central function, a printer function for printing a document by a word processor and the like, a scanner function for scanning an image and storing it as a data-base file, and the like, a facsimile function for transmitting and receiving a facsimile image, and a network function for printing image data from a network and sending an image by a scanner to a network.

Table I indicates enlargement ratios when three kinds of facsimile (FAX) image are printed in three kinds of printer which have resolutions of 300 dpi, 400 dpi, and 600 dpi. For example, a facsimile image of 8 (dot/mm)×7.7 (dot/mm) is enlarged at twice vertically and horizontally to print its facsimile image in a 400 dpi printer. Moreover, the printer of a recent digital copying machine can output multilevel tones. Therefore a system for printing a facsimile image which has the smoothing enlargement function and multilevel output function is required.

TABLE 1

|  | enlargement ratio | | |
| --- | --- | --- | --- |
| Fax Image | 300 dpi (12 (dot/mm) × 12 (dot/mm)) | 400 dpi (16 (dot/mm) × 16 (dot/mm)) | 600 dpi (24 (dot/mm) × 24 (dot/mm)) |
| 8 (dot/mm) × 3.85 (dot/mm) | 1.5 × 3 | 2 × 4 | 3 × 6 |
| 8 (dot/mm) × 7.7 (dot/mm) | 1.5 × 1.5 | 2 × 2 | 3 × 3 |
| 16 (dot/mm) × 15.4 (dot/mm) | — | 1 × 1 | 1.5 × 1.5 |

SUMMARY AND OBJECT OF THE INVENTION

Accordingly, one object of this invention is to provide an image processing apparatus in which both smoothing enlargement and multilevel output are achieved by a novel method.

Another object of this invention is to provide an image processing apparatus in which an enlargement ratio is at some number of times, for example 1.5 times, including an integral number, and multilevel output is achieved.

These and other objects and advantages are achieved by the present invention which provides for an image processing apparatus comprising a smoothing enlarger for enlarging certain binary image data into more binary image data of black and white pattern for reducing a jaggy image, a divider for dividing the binary image data into blocks of binary image data, and a multileveler for multileveling each block and creating multilevel image data. In accordance with one aspect of the invention, smoothing enlargement, dividing, and multileveling is achieved by a novel method.

BRIEF DESCRIPTION OF THE DRAWINGS

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

A more complete appreciation of the invention and the many attendant advantages thereof will become readily apparent from the following detailed description, particularly when considered in conjunction with the drawing in which:

FIGS. 4(a) and 4(f) are schematic diagrams for explaining the operation of some embodiments for the smoothing enlargement through multileveling blocks of FIG. 1;

DETAILED DESCRIPTION OF THE PREFERRED EMBODIMENTS

Figure 2:
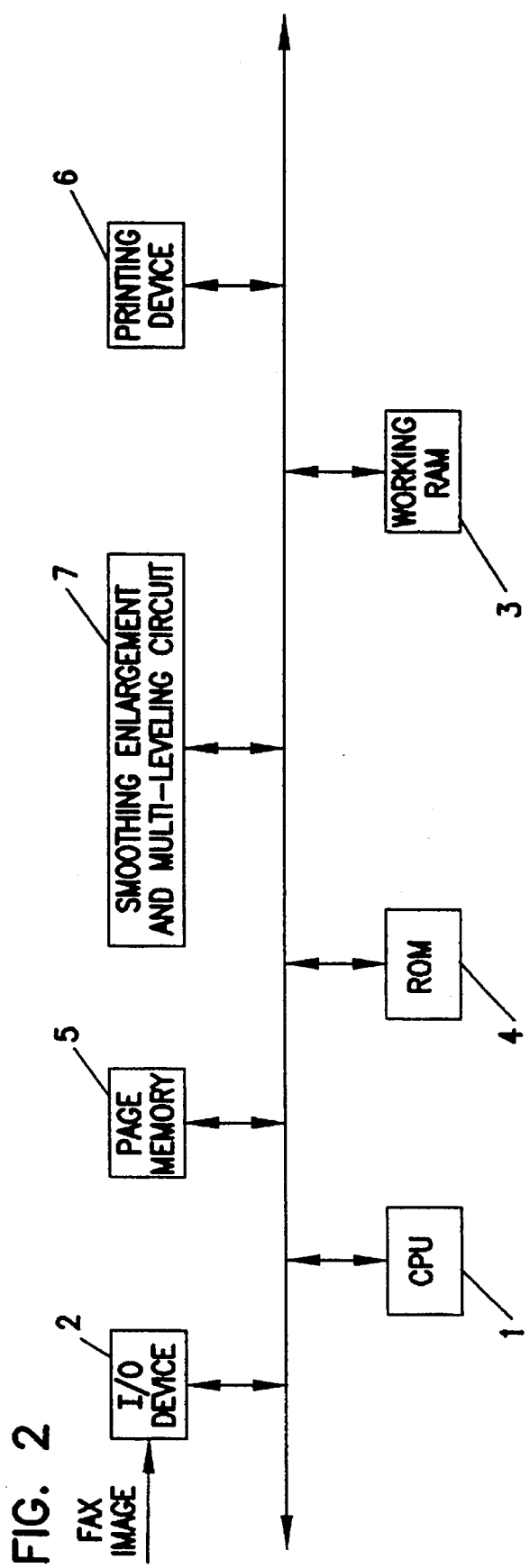
FIG. 2 is a block diagram of a page-printer including an embodiment of the present invention.

This invention will be described on the basis of the drawings. FIG. 2 is a block diagram of a page-printer incorporating an embodiment of the present invention. In this page-printer, a facsimile image from a modem (not shown) is received in an input/output (I/O) device 2 which is controlled by a CPU 1 and then stored in a working RAM 3. Then, the facsimile image is processed according to a program in a ROM 4, and is stored in a page memory 5. After that, printing device 6 reads the binary image data in the page memory 5, and enlarges and multilevels the data in a smoothing enlargement and multileveling circuit 7. In this way a high quality image is achieved.

Figure 1:
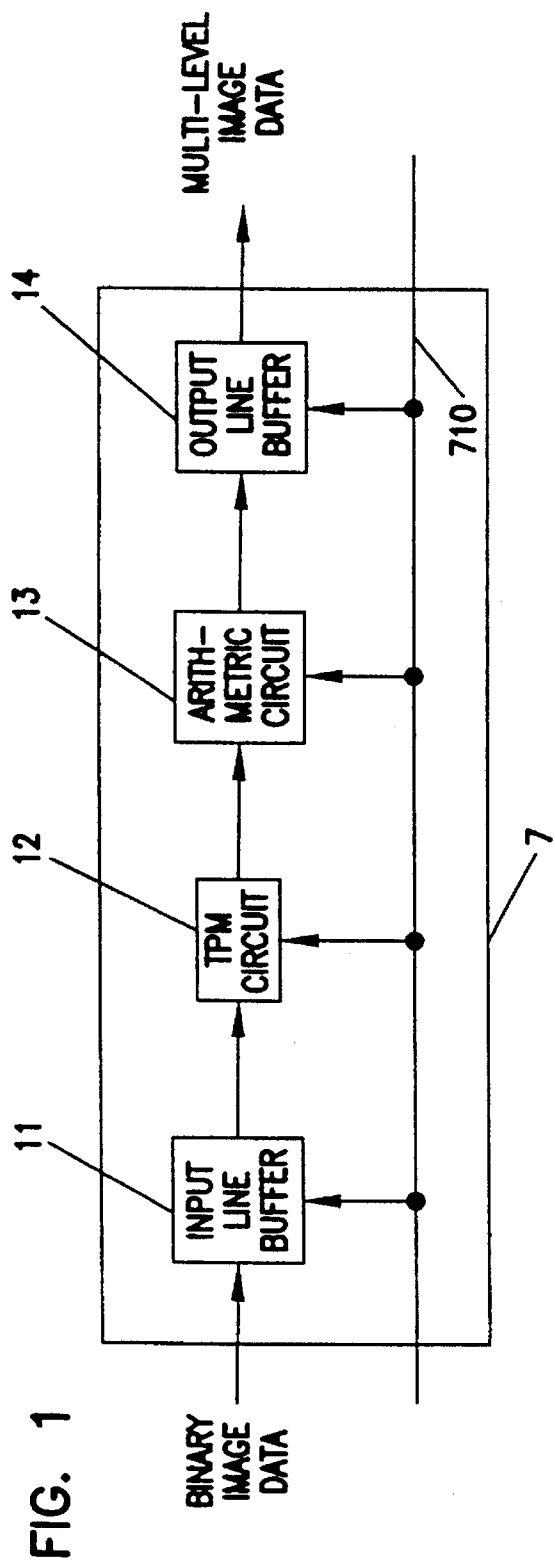
FIG. 1 is a block diagram of the smoothing enlargement and multileveling system of the present invention.

FIG. 1 is a block diagram of an embodiment of the structure for the smoothing enlargement and multileveling circuit 7 shown in FIG. 2. It comprises an input line buffer (a first line buffer) 11 for storing binary image data of plural lines, a template pattern machine (TPM) circuit 12 for enlarging the binary image data into a black-and-white pattern for reducing jaggy images according to an enlargement ratio which is decided by the resolution of the facsimile image and that of the printer, an arithmetic circuit for dividing the enlarged binary image data into a predetermined number of blocks according to the enlargement ratio and then multileveling the blocks, and an output line buffer 14 (a second line buffer) for storing the blocks (multilevel data) of plural lines and outputting them to the printing device synchronized to a clock (not shown).

Figure 3A:
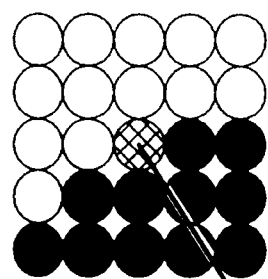
FIGS. 3(a) and 3(b) are schematic diagrams for explaining the operation of an embodiment of the smoothing enlargement function in the smoothing enlargement block and the multileveling block of FIG. 1.
Figure 3B:
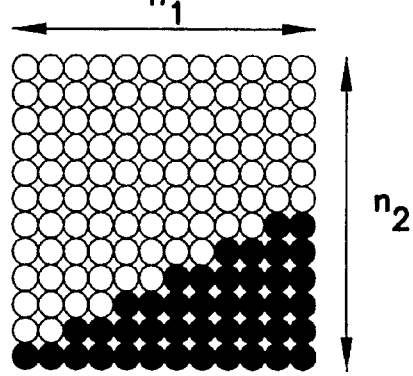
Figure 3B:
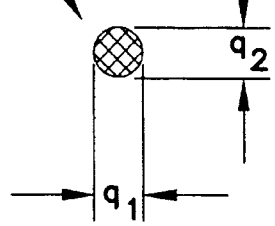

The way in which the smoothing enlargement and multileveling circuit 7 functions will be described using FIGS. 3 through 6. In FIG. 3(a), the aimed image data (shown by closshatching) is enlarged into 12×12 dots. The black and white pattern in FIG. 3(b) is selected to reduce the jaggy image. Next, according to the enlargement ratio, if it is equal, the 12×12 dots are multileveled as shown in FIG. 4(a) and the multilevel is normalized by the multilevel P of the printing device. That is, in FIG. 4(a), the number of black dots is 42 dots in the enlarged 12×12 dots, therefore $$42/(12 \times 12) \times P = (7/24)P.$$

Moreover, if the enlargement ratio is 2×2 times, the enlarged image data of 12×12 dots are divided into four blocks of 6×6 dots of image dots as shown in FIG. 4(b). Each block of 6×6 dots is multileveled.

Therefore, the number of black dots of each block is 0 dots for the first block, 0 dots for the second block, 12 dots for the third block and 30 dots for the fourth block. So the four blocks yield the following four items of multilevel image date:

$$0/(6 \times 6) \times P = 0$$

$$0/(6 \times 6) \times P = 0$$

$$12/(6 \times 6) \times P = (1/3)P$$

$$30/(6 \times 6) \times P = (5/6)P.$$

The four blocks are converted to the above 4 items of multilevel data.

In the same way as above, in enlargements of 2×4 times, 3×3 times, 3×6 times, as shown in FIGS. 4(c), (d), (e), the 12×12 dots are divided into the blocks of each image data of 6×3 dots, 4×4 dots, 4×2 dots, respectively, and each block in FIGS. 4(c), (d), (e) is multileveled.

The above-described relation is summarized in the equations $$\frac{K1}{q1} \times \frac{K2}{q2} \text{ and } \frac{n1/m1}{q1} \times \frac{n2/m2}{q2}$$

as shown in FIG. 4F. q1×q2 dot array of binary image data is enlarged to a n1×n2 dot array of binary image data. The n1×n2 array is divided in k1×k2 blocks of binary image data, and each block has an m1×m2 array of dots. The above-described variables q1, q2, n1, n2, m1, m2, k1, k2 are each an integer greater than or equal to 1. Furthermore, these variables satisfy the following relations:

$$(q1 \times q2) \geq 1;$$

$$(n1 \times n2) > (q1 \times q2);$$

$$(n1 \times n2) = (k1 \times k2)(m1 \times m2);$$

and $$(k1 \times k2) \geq (q1 \times q2).$$

Figure 5A:
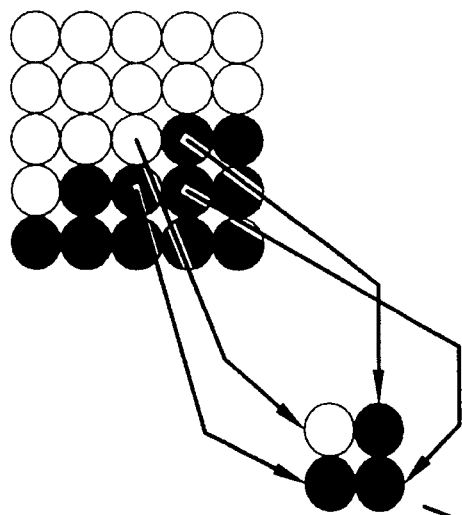
FIGS. 5(a) and 5(b) are schematic diagrams for explaining the operation of another embodiment for the smoothing enlargement of the smoothing enlargement block and the multileveling block.
Figure 5B:
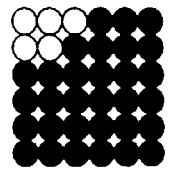
Figure 6A:
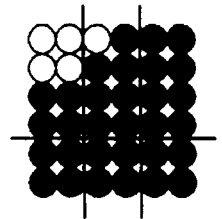
FIGS. 6(a) and 6(B) are schematic diagrams for explaining the operation of other embodiments for smoothing enlargement and multileveling of the smoothing enlargement block and the multileveling block of FIG. 1.
Figure 6B:
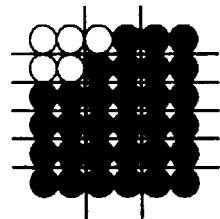
Figure 7:
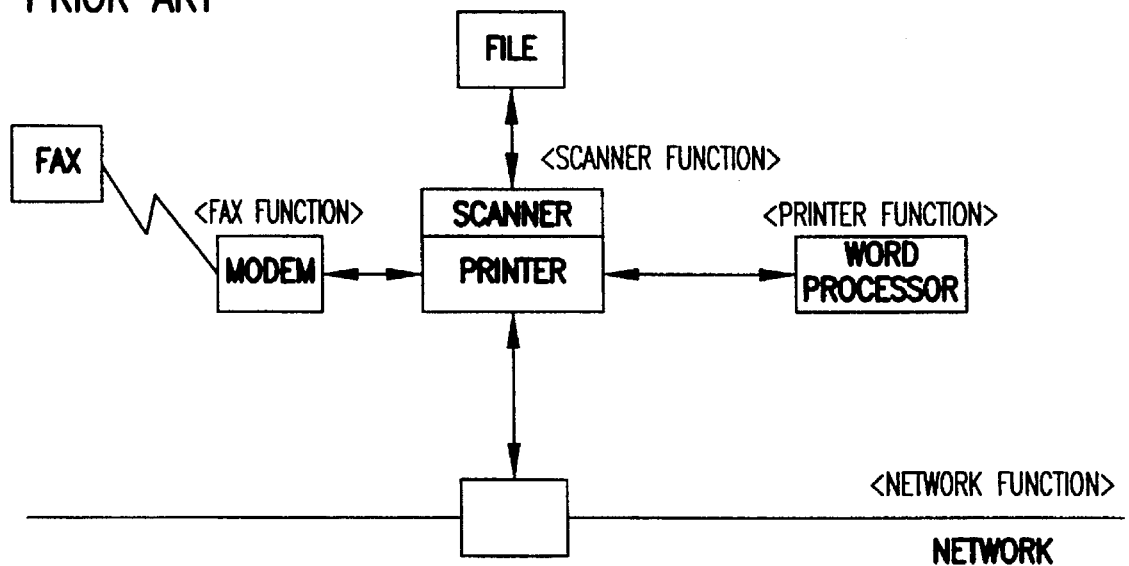
FIG. 7 is a schematic diagram showing a prior art complex digital copying system.

Moreover, when 1.5×1.5 times, or 1.5×3 times enlargement is contemplated, 2×2 dots aimed image data are enlarged into 6×6 dots as shown in FIG. 5(a). They are divided into blocks of image data of 2×2 dots or 2×1 dots, and each block is multileveled.

As described above, a novel smoothing enlargement and multileveling method is achieved.

Next, the description of the circuit in FIGS. 1 and 2 are presented.

After the image data of one page is stored in the page memory 5, the printing device 6 sends synchronizing signal 710 to page memory 5 through the smoothing enlargement and multileveling circuit. The synchronizing signal 710, may be composed of for example, FGATE which is a sub-scanning synchronizing signal, LGATE which is a main scanning signal and CLK which is a clock synchronizing signal for transferring image data. The page memory 5 sends the image data of one line which is renewed with synchronizing by the LGATE in the smoothing enlargement and multileveling circuit. The input page memory 11 stores the image data in the line buffer 5. After it stores image data of 5 lines, operation of the TPM circuit 12 starts. That is, 25 image data including aimed data are enlarged in the TPM circuit, and synchronized to the CLK. The result is divided and multileveled according to the enlargement ratio in the arithmetic circuit, synchronized to the CLK. The result is stored in the output buffer 14, synchronized to the synchronizing signal 710. The output line buffer 14 sends the multileveled data to the printing device 6 synchronized to the synchronizing signal 710. Then they are printed in the printing device 6.

As described above, the method of this invention can prevent processing speed loss and therefore real time processing can be achieved in the circuit in FIG. 1.

As an embodiment of this invention, the embodiment applied to a page printer has been described. This invention can be also applied to other image forming apparatus, such as a digital copying machine, a digital facsimile machine, and the like. Moreover, it can be applied to output media, such as CRT and the like.

What is claimed is:

1. An image processing apparatus comprising:

smoothing enlargement means for enlarging a q1×q2 dot array of binary image data into an n1×n2 dot array of binary image data having a black and white pattern and for smoothing a jagged image;

dividing means for dividing the n1×n2 dot array into k1×k2 blocks of binary image data with each block being an m1×m2 array of dots; and multileveling means for multileveling each block of the divided binary data and making k1×k2 items of multilevel image data;

wherein:

$$(q1 \times q2) > 1,$$

$$(n1 \times n2) > (q1 \times q2),$$

$(m1 \times m2) > (q1 \times q2)$, $(n1 \times n2) = (k1 \times k2)(m1 \times m2)$, $(k1 \times k2) > (q1 \times q2)$, and q1, q2, n1, n2, m1, m2, k1, and k2 are integers greater than or equal to 1.

2. The image processing apparatus of claim 1, wherein the enlargement ratio (k1/q1) in the horizontal direction and (k2/q2) in the vertical direction are decided by the ratio between the resolution of the image data of the input means and that of the image data of the output means.

3. The image processing apparatus of claim 1, wherein the multilevel image data of each block is decided by the number of black dots in the m1×m2 array divided by the total number of dots in the m1×m2 array.

4. The image processing apparatus of claim 1, wherein (q1×q2)=1.

5. The image processing apparatus of claim 4, wherein n1=n2.

6. The image processing apparatus of claim 5, wherein n1=n2≧=8.

7. The image processing apparatus of claim 1, wherein (q1×q2)>1.

8. The image processing apparatus of claim 7, wherein the enlargement ratio in the vertical or horizontal direction is not an integral number and (k1/q1) or (k2/q2) does not equal an integral number.

9. An image processing apparatus comprising:

input means for inputting binary image data of plural lines;

smoothing enlargement means for enlarging a q1×q2 dot array of binary image data into an n1×n2 dot array of binary image data having a black and white pattern and for smoothing a jagged image;

dividing means for dividing the n1×n2 dot array into k1×k2 blocks of binary image data with each block being an m1×m2 array of dots;

multileveling means for multileveling each block of the divided binary image data and making k1×k2 items of multilevel image data;

second storing means for storing output data of plural lines from the multileveling means; and output means for outputting the multilevel image data from the second storing means;

wherein:

$(q1 \times q2) > 1$, $(n1 \times n2) > (q1 \times q2)$, $(m1 \times m2) > (q1 \times q2)$, $(n1 \times n2) = (k1 \times k2)(m1 \times m2)$, $(k1 \times k2) > (q1 \times q2)$, and q1, q2, n1, n2, m1, m2, k1, and k2 are integers greater than or equal to 1.

10. The image forming apparatus of claim 9, further comprising a page memory which stores a page amount of binary image data and printing means for printing the multilevel image data, and wherein the smoothing enlargement means, the dividing means and the multileveling means are arranged between the page memory and the printing means.

11. The image forming apparatus of claim 10, wherein the resolution of the image data of the input means is 8 (dot/mm)×3.85(dot/mm), 8(dot/mm)×7.7(dot/mm) or 16(dot/mm)×15.4(dot/mm), and the resolution of the image dots of the output means is 300 dpi(12(dot/mm)×12(dot/mm)), 400 dpi (16(dot/mm)×16(dot/mm)) or 600 dpi(24(dot/mm)×24(dot/mm)), and the enlargement ratio is (k1/q1) in the horizontal direction and (k2/q2) in the vertical direction are is decided by the ratio between the resolution of the image data of the input means and that of the image data of output means.

12. An image processing apparatus comprising:

a smoothing enlarger having an input receiving a q1×q2 dot array of binary image data and having an output providing an enlarged n1×n2 dot array of binary image data having a black and white pattern constituting a smoothed enlargement of a jagged image;

a divider having an input receiving the n1×n2 dots of binary image data and having an output providing k1×k2 blocks of binary image data constituting a divided portion of the n1×n2 dots of binary image data, with each block being an m1×m2 array of dots; and a multileveler having an input receiving each block of the divided binary image data and having an output providing k1×k2 items of multilevel image data;

wherein:

$(q1 \times q2) > 1$, $(n1 \times n2) > (q1 \times q2)$, $(m1 \times m2) > (q1 \times q2)$, $(n1 \times n2) = (k1 \times k2)(m1 \times m2)$, $(k1 \times k2) > (q1 \times q2)$, and q1, q2, n1, n2, m1, m2, k1, and k2 are integers greater than or equal to 1.

* * * * *